United States Patent Office

3,092,648
Patented June 4, 1963

3,092,648
IMPROVEMENTS IN THE PREPARATION OF ALUMINUM HYDRIDE CONTAINING MATERIALS
Roland Köster, Mulheim (Ruhr), Germany, assignor to Studiengesellschaft Kohle m.b.H., Mulheim (Ruhr), Germany, a corporation of Germany
No Drawing. Filed Jan. 7, 1957, Ser. No. 632,653
Claims priority, application Germany Jan. 9, 1956
19 Claims. (Cl. 260—448)

This invention relates to new and useful improvements in the preparation of aluminum hydride.

It is not possible to produce aluminum hydride by a direct reaction between aluminum and hydrogen, and it was generally necessary, in order to produce this material, to react aluminum chloride with lithium aluminum hydride. The aluminum chloride-lithium aluminum hydride reaction takes place in accordance with the following equation:

$$AlCl_3 + 3LiAlH_4 \rightarrow 3LiCl + 4AlH_3$$

The lithium aluminum hydride is obtained by reaction of lithium hydride and aluminum chloride in the molar ratio of 4:1 in accordance with the following equation:

$$AlCl_3 + 4LiH \rightarrow LiAlH_4 + 3LiCl$$

It therefore follows that a total of 3 mols of lithium hydride is required for the preparation of each mol of aluminum hydride in accordance with the conventional mode of production. The process is therefore extremely costly.

One object of this invention is a novel and more economical method for the production of aluminum hydride. This, and still further objects will become apparent from the following description:

In accordance with the invention it has now been found that solid products having a high content of aluminum hydride may be easily obtained by reacting an aluminum halide or an alkyl aluminum halide with a dialkyl aluminum hydride.

The reaction of the aluminum halide with the dialkyl aluminum hydride proceeds in accordance with the following equation:

$$AlHal_3 + 3R_2AlH \rightarrow AlH_3 + 3R_2AlHal$$

in which R represents an alkyl radical and Hal represents a halogen atom, and preferably chlorine.

The reaction of the alkyl aluminum halide with the dialkyl aluminum hydride proceeds in accordance with the following equation:

$$2AlHal_2R + 3AlHR_2 \rightarrow AlH_3 + 4AlHalR_2$$

in which Hal and R are as given above.

Since the aluminum halide, such as aluminum chloride is solid, and since the alkyl aluminum halide, as, for example, the alkyl aluminum dichloride, is liquid, it is often preferable to use the alkyl aluminum halide rather than the aluminum halide. The aluminum halide may be very easily converted into the corresponding alkyl aluminum halide by reaction of the same with a dialkyl aluminum halide. In connection with the conversion of aluminum chloride into alkyl aluminum dichloride, the reaction proceeds as follows:

$$AlCl_3 + AlClR_2 \rightarrow 2AlCl_2R$$

in which R is as given above.

Upon the reaction of the liquid alkyl aluminum halide with the dialkyl aluminum hydride, the corresponding dialkyl aluminum monohalide is formed as a by-product. This dialkyl aluminum mono-halide can be again reacted with the aluminum chloride to form the starting monoalkyl aluminum dihalide, so that the reaction using the monoalkyl aluminum dihalide may, in effect, be considered a conversion of the aluminum halide.

The reaction proceeds by merely contacting the aluminum halide or the monoalkyl aluminum dihalide with the dialkyl aluminum hydride. This contacting may be effected with the compounds as such or in the presence of an organic solvent, as, for example, a hydrocarbon, such as hexane. When operating with the aluminum halide which constitutes an insoluble solid, it is preferable to form a suspension in organic solvent, such as the hexane, and to effect the contacting with agitation, as, for example, in a mill.

As a result of the contacting, the solid containing the aluminum hydride precipitates out in a difficultly soluble form, which may easily be isolated from the reaction mixture by filtration, centrifuging, or the like.

This solid material is not pure aluminum hydride of the formula $AlH_3$, but contains about 60–70% of aluminum hydride. The balance generally consists of organic aluminum compounds which contain halogen atoms, alkyl radicals and which may partially be present as aluminum alkyl dihydrides. The solid aluminum hydride containing product formed may be used in the same manner as aluminum hydride per se, for most purposes, including the primary use of aluminum hydride, i.e., as a reducing agent.

If this solid precipitate is again treated with a dialkyl aluminum hydride, the halogen content thereof decreases and there is obtained a product which corresponds approximately to the composition $Al_2H_5R$. This material may possibly constitute compounds of aluminum hydride with monoalkyl aluminum dihydrides.

The aluminum hydride formed in accordance with the invention may be easily separated from the admixed liquid dialkyl aluminum halide by distillation in vacuum, and, in particular, under a high vacuum. The compounds of the formula $R_2AlHal$ obtained as a by-product, are readily volatile under a relatively high vacuum, having a boiling point of less than 50° C. at $10^{-2}$ to $10^{-3}$ mm. Hg, and can be readily distilled off, the solid aluminum hydride remaining as a residue.

The distillation is preferably effected in a film evaporator, in which the material to be distilled is passed in a thin film over an evaporating, and generally over a vertical, cylindrical evaporating surface, as, for example, by means of rotating blades or the like. The liquid suspension of the aluminum hydride, as, for example, in diethyl aluminum chloride, may be introduced from above into the film evaporator with the solid aluminum hydride dropping out from the bottom of the evaporator, while the vapors escape laterally on the top into a condenser, in which they are condensed. This manner of operation is completely unexpected, since it is known that aluminum hydride readily decomposes into its components.

The process in accordance with the invention offers the possibility of preparing aluminum hydride directly from aluminum and hydrogen without the use of lithium hydride. Dialkyl aluminum hydrides can be readily obtained directly from aluminum hydrogen and olefins. The dialkyl aluminum halides obtained as by-products in the process in accordance with the invention may be converted into aluminum trialkyls with sodium fluoride, which in turn may be converted into dialkyl aluminum hydrides by heating possibly in the presence of aluminum and hydrogen. Taking all of these reactions in combination, the over-all equation for the formation of aluminum hydride in accordance with the invention, using, for example, aluminum chloride as the aluminum halide, may be represented as follows:

$$Al + 3/2H_2 + AlCl_3 + 6NaF \rightarrow AlH_3 + Na_3AlF_6 + 3NaCl$$

The dialkyl aluminum halides, such as dialkyl aluminum chlorides, may also be converted into aluminum trialkyls by treatment with metallic sodium in the known manner in accordance with the reaction $$3R_2AlCl + 3Na \rightarrow 3NaCl + Al + 2AlR_3$$

In this manner there is obtained a mixture of finely divided aluminum and aluminum trialkyl, which, by means of hydrogen under pressure, can be directly converted back into dialkyl aluminum hydride in an equi-molar amount to the starting dialkyl aluminum monohalide. Keeping this reaction in mind, the conversion of the aluminum hydride in accordance with the invention may be represented by the following over-all equation:

$$AlCl_3 + 3Na + 3/2 H_2 \rightarrow 3NaCl + AlH_3$$

While the use of chlorine as the halogen is preferred in accordance with the invention for economic reasons, other halides may be used in place of the chlorine compounds.

The following examples are given by way of illustration and not limitation:

Example 1

40.2 grams (0.317 mol) aluminum ethyl dichloride are added under nitrogen to 41.4 grams (0.481 mol) aluminum diethyl hydride dissolved in 75 cc. of hexane. After a short time the mixture becomes cloudy. The substance is allowed to react with continuous stirring for 5–6 hours, in which connection the temperature of the bath can be increased to about 50° C. A voluminous, colorless precipitate is formed, from which the liquid is filtered under nitrogen. The solid substance is thereupon washed several times with hexane until halogen can no longer be detected in the filtrate. This is preferably effected by a continuous cold extraction with agitation. Finally, the compound is dried under reduced pressure (high vacuum) at a bath temperature of a maximum of 70° C. There remains a completely colorless powder (4–5 grams), which sparks vigorously in the air with manifestation of fire. The analyses of the compound prepared in this manner show aluminum values of about 56% and chlorine values of about 15%. The gas (53.8 cc. (NTP)) obtained by decomposing a sample (58.2 mg.) consists of hydrogen (90%) and ethane (10%).

Example 2

To 56.5 grams (0.398 mol) aluminum diisobutylhydride, there are rapidly introduced drop by drop 57 grams (0.267 mol) of aluminum ethyl dibromide under nitrogen. Only a slight liberation of heat occurs in this connection. Furthermore, a cloud is immediately formed, and after 5–6 hours the precipitation is completed at a bath temperature of a maximum of 60° C. the colorless, solid compound is filtered off under nitrogen and washed with hexane until no further bromide is detectable in the filtrate. Thereupon drying in a high vacuum produces a bromine-containing compound (4.5 grams), corresponding to the compound described in Example 1.

Example 3

66.8 grams (0.5 mol) anhydrous aluminum chloride are ground with the exclusion of air in 200 cc. of hexane for one hour in a ball mill. 172 grams (1.5 mols) aluminum di-n-propylhydride, dissolved in 100 cc. hexane, are allowed to flow slowly with frequent shaking into the suspension prepared in this manner, the ball mill vessel being cooled with ice water from the outside. Thereupon the reaction is carried out to completion for about 4 hours in the ball mill vessel. The suspension produced is evacuated under nitrogen and filtered. After washing the separated solid material with hexane and drying in vacuum, there is obtained a compound, the composition of which corresponds to the substance described in Example 1.

Example 4

To 258 grams (3 moles) of aluminum diethyl hydride there are added while stirring, with the exclusion of air a total of 254 grams (2 mols) aluminum ethyl dichloride over the course of ½–1 hour. As in Example 1, the precipitation is completed in 5–6 hours. It is filtered off under nitrogen.

The diethyl aluminum monochloride, which was formed in the reaction and filtered off, can thereupon be reacted with aluminum trichloride. The 480 grams of aluminum diethyl monochloride (chlorine value found=29%) is treated with a total of 530 grams anhydrous aluminum trichloride and heated while stirring for a short time until the aluminum trichloride has completely dissolved. The compound which crystallizes out upon cooling (aluminum ethyl dichloride) can be used again for a new reaction. The solid, colorless residue from the above-described reaction is formed into a suspension in 100 cc. of hexane, and 12 grams (0.14 mol) aluminum diethyl hydride are added to the suspension. The reaction is allowed to continue at a maximum of 50° C. for a further 5–6 hours while stirring. Thereupon the precipitate is filtered off and washed with hexane. There remains a compound, the composition of which corresponds to the formula $Al_2H_5(C_2H_5)$. (Aluminum value found=61%.) Small quantities of chloride (less than 4%) can frequently still be detected as impurity.

Example 5

60 grams (0.47 mol) aluminum monoethyl dichloride are added drop by drop under nitrogen to 100 grams (1.16 mols) aluminum diethyl hydride over the course of 15 minutes at room temperature; in this connection with good agitation and spontaneous heating to about 40° C., a colorless precipitate deposits upon the addition of the total quantity of aluminum monoethyl dichloride. Stirring is continued for 8 hours between 30 and 40° C. Finally, by distillation in high vacuum (B.P.$_{10^{-3}}$=40° C.) (preferably with the use of a film evaporator) there is obtained, in addition to a colorless distillate, a completely dry aluminum hydride (about 4 grams). It consists of a powder which sparks in the air with the manifestation of fire.

I claim:

1. Process for the preparation of a material substantially equivalent to aluminum hydride as a reactant and essentially consisting of $AlH_3$ and dialkyl aluminum halide, which comprises reacting a member selected from the group consisting of aluminum halides and mono-alkyl aluminum dihalides with a stoichiometric amount of a monomeric dialkyl aluminum hydride based on the applicable one of the equations $$AlX_3 + 3R_2AlH \rightarrow AlH_3 + 3R_2AlX$$

and $$2RAlX_2 + 3R_2AlH \rightarrow AlH_3 + 4R_2AlX$$

wherein R represents an alkyl radical and X represents a halogen, and recovering the solid reaction product formed.

2. Process according to claim 1, in which said group member is a chloride.

3. Process according to claim 1, in which said group member is aluminum chloride.

4. Process according to claim 1, in which said group member is a liquid mono-alkyl aluminum dihalide.

5. Process according to claim 1, which includes recovering the dialkyl aluminum halide formed as a by-product, reacting said dialkyl aluminum halide with sodium fluoride to thereby form an aluminum trialkyl, and converting said aluminum trialkyl to a dialkyl aluminum hydride for said reacting.

6. Process according to claim 5, in which said group member is a chloride and in which said recovered dialkyl aluminum halide is a dialkyl aluminum chloride.

7. Process according to claim 1, which includes recovering the dialkyl aluminum halide formed as a by-product, reacting said recovered dialkyl aluminum halide with metallic sodium to thereby form an aluminum trialkyl, and converting said aluminum trialkyl into a dialkyl aluminum hydride for said reacting.

8. Process according to claim 7, in which said group member is a chloride and in which said recovered dialkyl aluminum halide is a dialkyl aluminum chloride.

9. Process according to claim 1, in which said monoalkyl aluminum dihalide is a lower mono-alkyl aluminum dihalide, and in which said dialkyl aluminum hydride is a lower dialkyl aluminum hydride.

10. Process according to claim 1, in which said contacting is effected in the presence of an inert diluent.

11. Process according to claim 10, in which said inert diluent is a hydrocarbon.

12. Process according to claim 11, in which said inert diluent is hexane.

13. Process according to claim 1, in which said recovery is effected by filtration.

14. Process according to claim 1, in which said recovery is effected by vacuum distillation.

15. Process according to claim 14, in which said distillation is effected in a film evaporator.

16. Process according to claim 1, in which said group member is a chloride and in which said dialkyl aluminum hydride is diethyl aluminum hydride.

17. Process according to claim 16, which includes recovering the diethyl aluminum chloride formed as a by-product.

18. Process for the preparation of a product which corresponds approximately to the composition $Al_2H_5R$ in which R represents an alkyl radical which comprises reacting a member selected from the group consisting of aluminum halides and monoalkyl aluminum dihalides with a dialkyl aluminum hydride of the general formula $AlHR_2$ in which R represents an alkyl radical, said reacting being effected with a molar proportion of said group member and said dialkyl aluminum hydride sufficient to form a solid reaction product containing aluminum hydride and dialkyl aluminum halide, and thereafter reacting said solid reaction product formed with a dialkyl aluminum hydride in amount sufficient to form a product corresponding approximately to the composition $Al_2H_5R$.

19. Process for the preparation of a material substantially equivalent to aluminum hydride as a reactant and consisting essentially of about 60–70% $AlH_3$ and 30–40% of dialkyl aluminum halide, which comprises reacting a member selected from the group consisting of aluminum halides and monoalkyl aluminum dihalides with a stoichiometric amount of a monomeric dialkyl aluminum hydride based on the applicable one of the equations $$AlX_3 + 3R_2AlH \rightarrow AlH_3 + 3R_2AlX$$

and $$2RAlX_2 + 3R_2AlH \rightarrow AlH_3 + 4R_2AlX$$

wherein R represents an alkyl radical and X represents a halogen, and recovering the solid reaction product formed.

References Cited in the file of this patent

UNITED STATES PATENTS

| | | |
|---|---|---|
| 2,270,292 | Grosse | Jan. 20, 1942 |
| 2,786,860 | Ziegler et al. | Mar. 26, 1957 |

FOREIGN PATENTS

| | | |
|---|---|---|
| 779,873 | Great Britain | July 24, 1957 |

OTHER REFERENCES

Stecher et al.: "Berichte der Deutschen Chemische Gesellschaft," vol. 75 (1942), pp. 2005–2007.

Klemm: "Fiat Review of German Science," 1939–46, Inorganic Chemistry, vol. 1, p. 148, pub. 1948.

Gaylord: "Reduction With Complex Metal Hydrides," 1956, p. 12.